US006977918B2

(12) United States Patent
Tran et al.

(10) Patent No.: US 6,977,918 B2
(45) Date of Patent: Dec. 20, 2005

(54) METHOD AND APPARATUS FOR PROCESSING A SIGNAL RECEIVED IN A HIGH DATA RATE COMMUNICATION SYSTEM

(75) Inventors: Jean-Marie Tran, San Diego, CA (US); Thomas Kenney, San Diego, CA (US)

(73) Assignee: Nokia Corp., Espoo (FI)

( * ) Notice: Subject to any disclaimer, the term of this patent is extended or adjusted under 35 U.S.C. 154(b) by 817 days.

(21) Appl. No.: 09/896,153

(22) Filed: Jun. 29, 2001

(65) Prior Publication Data

US 2003/0002453 A1    Jan. 2, 2003

(51) Int. Cl.[7] .............................................. H04J 3/24
(52) U.S. Cl. ...................... 370/349; 370/328
(58) Field of Search ................. 370/328, 329, 370/330, 335, 336, 342, 347, 349, 441, 442, 370/468, 478, 479; 375/142, 228

(56) References Cited

U.S. PATENT DOCUMENTS

| 5,790,596 A | * | 8/1998 | Sexton ........................ 375/228 |
| 6,335,922 B1 | * | 1/2002 | Tiedemann et al. ......... 370/335 |
| 6,590,888 B1 | * | 7/2003 | Ohshima ..................... 370/342 |
| 6,788,731 B2 | * | 9/2004 | Kim et al. ................... 375/142 |

* cited by examiner

*Primary Examiner*—Bob A. Phunkulh
(74) *Attorney, Agent, or Firm*—Tom Weber; Milan Patel

(57) ABSTRACT

The present invention encompasses an electronic device operated in a communication system (for example 1XEV-DO, 1XEV-DV, CDMA, etc). The electronic device receiving a signal from a base station, the signal containing signaling information and data packets. The electronic device processing portion of the signal during the current frame and simultaneously storing the received signal prior to de-spreading, for further processing during the following frame. The electronic device further processing previously stored signal, during current frame.

25 Claims, 4 Drawing Sheets

METHOD AND APPARATUS FOR PROCESSING A SIGNAL RECEIVED IN A HIGH DATA RATE COMMUNICATION SYSTEM

FIELD OF THE INVENTION

The present invention relates to a communication technique used in a wireless communication system and, more particularly, to a receiver for processing a received signal from a base station.

BACKGROUND OF THE INVENTION

A communication system is formed, at a minimum, of a base station and a mobile station, which are interconnected by way of a communication channel. Information to be communicated by the base station (also referred to as cell site) to the mobile station is transmitted via the communication channel to the mobile station. A wide variety of different types of communication systems have been developed and are regularly utilized to effectuate communication of information between base stations and mobile stations.

A wireless communication system, is an example of a communication system, which has been made possible due to advancements in communication technologies. Various standards have been promulgated relating to various types of wireless communication systems, and various types of wireless, as well as other, communication systems have been constructed, corresponding to such standards. The IS-95 and IS-2000 interim standards, promulgated by the EIA/TIA, are exemplary of standards which pertain to a wireless communication system, utilizing code division multiple access (CDMA) communication techniques.

Enhanced $3^{rd}$ Generation CDMA systems are currently being developed to address high speed Internet packet data services. Examples of such systems, which are the result of an evolution of IS-95 and IS2000, are 1XEV-DO (TIA/EIA/IS-856) and 1XEV-DV standards. These systems utilize both CDMA and some type of time division multiplexing communication techniques.

In an effort to port the Internet to the wireless communication system, 1XEV-DO and 1XEV-DV systems use a fat data pipe concept, which is shared among a number of users (mobile stations). The fat pipe, called the shared supplemental channel, is de-multiplexed into several code channels according to the usual CDMA access techniques. In the current proposal for 1XEV-DV, for example, the pipe is actually transmitted on 14 or 15 Walsh codes of length 16.

In high data rate systems, it is assumed that low mobility prevails and the use of soft handoff is not needed. Also, use of soft handoff would reduce the data rate capacity of the system. Therefore, a fast cell site selection is performed in the network, aided by measurements made at the mobile station. However, the mobile station can only assist the BS by sending information on the reverse link. Because of impairments on the reverse link, the BS may actually select a less then preferred cell site. instead of the preferred target cell site In the high data rate, the shared supplemental channel is shared among a number of mobile stations in accordance with CDMA and TDMA communication techniques. The base station has an admission control algorithm such that the base station decides 1) when to transmit data packets to a particular mobile station; 2) the modulation type and coding rate; 3) the Walsh codes (among the 14 or 15 available) that will be assigned; and 4) the cell site that will transmit the data packets.

The BS simultaneously transmits the data packet, intended for the mobile station, on the supplemental channel and a signaling frame on the dedicated channel. This signaling frame provides the mobile station information such as 1) whether a data packet was sent to that MS; 2) the modulation type and coding rate used; 3) the Walsh codes; and 4) which cell site is transmitting on shared supplemental channel. Upon reception of a signaling frame, the mobile station decodes the dedicated channel and determines if there was a data packet for it on the shared supplemental channel. Thus, the mobile station is expected to buffer the received shared supplemental channel information in order to be able, after the fact, demodulate and decode the share supplemental channel. Generally, the dedicated channel and all the supplemental channels are de-spread to retrieve necessary information and all the expanded information is stored is a buffer. Generally, the buffer size required depends on the number of fingers needed, the number of Walsh channels, the sampling rate, etc. Since the mobile station must de-spread all the Walsh channels to determine if a data packet is transmitted for that MS, a large buffer size is needed, even if only one Walsh channel may apply.

Therefore, it would be useful if method and apparatus was provided to manage the buffering and processing of signals that would require less storage space and processing time.

SUMMARY OF THE INVENTION

The present invention, accordingly, advantageously, provides apparatus, and an associated method by which received communication signals are first stored in RAM and then processed.

The present invention encompasses a receiver having a buffer storing a received signal and replaying the received signal to process only a necessary portion of the signal. The buffer may comprise a plurality of buffers, wherein a received signal for a current frame is stored in a first buffer and a second buffer is used to process the signal received in a previous frame. According to an aspect of the invention, the received signal is stored in buffer prior to de-spreading the signal, thereby, advantageously requiring less storage space for the buffer. Once the signal is stored for a frame, during the next frame the signal may be evaluated to determine is any data for the mobile station has been transmitted on a shared supplemental channel. The signal is further processed only if data packets for that mobile station have been transmitted on the shared supplemental channel. Otherwise, advantageously, no further processing is performed on the signal to find data.

A more complete appreciation of the invention and to the scope thereof can be obtained from the accompanying drawings, the detailed description of the presently preferred embodiments of the invention, and the appended claims.

DETAILED DESCRIPTION OF THE INVENTION

Figure 1:
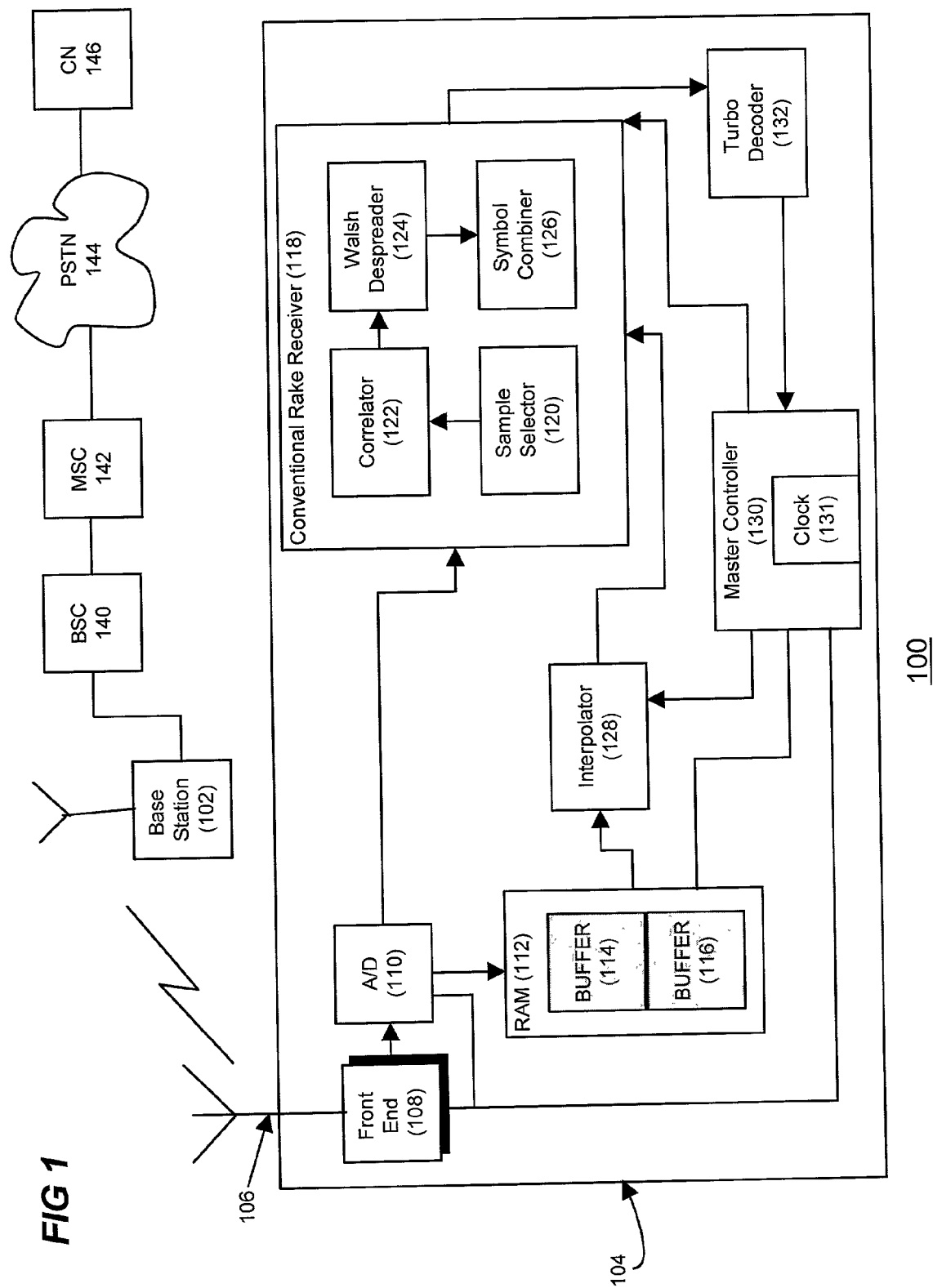
FIG. 1 illustrates a block diagram of an exemplary receiver used in a wireless communication system.

FIG. 1 illustrates an exemplary wireless communication system 100. The communication system 100 provides for radio communication between two communication stations, such as a base station 102 and a mobile station 104, by way of radio links formed therebetween. The mobile station 104 is configured to receive and transmit signals to communicate with plurality of base stations, including base station 102. In the exemplary embodiment shown in the figure, the communication system 100 operates according to the specification proposed for 1XEV-DO (approved version IS-856/TSG-C C.S0024 ver 2.0, published 10/2000) and 1XEV-DV (current proposal # C05-20010611-007 MNTIPA__1XEV-DV L1 Framework) communication system, which utilizes CDMA communication techniques. It should be understood that operation of the embodiment of the present invention is similarly also possible in other types of radio, and other, communication systems. Therefore, while the following description shall describe operation of an embodiment of the present invention with respect to the 1XEV-DO or 1XEV-DV systems, operation of an embodiment of the present invention can analogously be described with respect to any of various other types of communication systems.

The base station 102, is coupled to a base station controller (BSC) 140. And, the base station 102 is, in turn, coupled to a mobile switching center (MSC) 142. The MSC is coupled to a network backbone, here a PSTN (public switched telephonic network) 144, and correspondent node (CN) 146 is coupled to the PSTN 144. A communication path is formable between the correspondent node 146 and the mobile station 104 by way of the PSTN 144, the MSC 142, the BSC 140 and base station 102, and a radio link formed between the base station and the mobile station. Thereby, the communications, of both voice data and non-voice data, are effectual between the CN 146 and the mobile station 104. In the exemplary implementation as shown in the figures, the base station defines a cell, and numerous cell sites are positioned at spaced-apart location throughout a geographical area to define a plurality of cells within any of which the mobile station 104 is capable of radio communication with an associated base station to communication therewith.

In the operation of the communication systems 100 according to 1XEV-DO and 1XEV-DV systems, the base station 102 transmits spread spectrum signals to mobile station 104 on what is generally known as the forward link. In general, the forward link transmission comprises a plurality of frames defined by the proposed system specification. In the exemplary communication system, the signals are received substantially during the reception a frame on plurality of channels (forward link channels), generally comprising signals for a pilot channel, control channels, supplemental channels and dedicated channels. The supplemental channels comprise interleaved and spread data signals. The dedicated channel comprise signaling information about the data transmitted on the supplemental channels.

The base station 102 broadcasts on the forward link channels, for example, on a pilot channel, a paging channel, a control channel, a dedicated channel and a plurality of supplemental channels. Generally, all the supplemental channels are spread using a Walsh Code in a process known as Walsh covering. Additionally, all the channels are modulated using a modulation-coding scheme (MCS) having a modulation type and coding rate. The modulation schemes are defined by the type of system, such as 1-XEV-DO or 1XEV-DV, wherein each mobile station, in communication with one or more base stations, provides information, such as Carrier to Interference ratios (C/I) or Signal to Noise Ratio (SNR), to assist base stations in determining modulation type and coding rate.

In the exemplary communication systems, the supplemental channels are shared among a plurality of mobile stations (MS), including mobile station 104. The base station 102 operates according to an admission control algorithm which determines, when to transmit data packets to a particular mobile station, what modulation type and coding rate is used, which Walsh codes will be assigned to the mobile station, and which base station of the system will transmit. In the exemplary communication system according to 1XEV-DV, the supplemental channels typically comprise up to 16 channels (Walsh channels), wherein any one of the channels may contain a packet of data for a particular mobile station. Each of the Walsh channels is spread using a different Walsh covering.

In the exemplary communication systems, the base station simultaneously transmits a packet of data and signaling information. The signaling information indicates to the mobile station 104 that the packet of data is sent to the mobile station 104. The signaling information to determine the processing of supplemental channels, wherein the signaling information comprises the modulation type and the code rate, the Walsh codes that are utilized, and which base station is transmitting on the supplemental channels.

The mobile station 104, operable in 1XEV-DO and 1XEV-DV systems, comprises an antenna 106, a front end filter 108, an analog to digital (A/D) converter 110, a Random Access Memory (RAM) 112, a Rake receiver 118, an Interpolator 128, a Master controller 130 and a decoder 132. The antenna 106 receives radio frequency (RF) signals (forward link) from the base station 102 and from other base stations in the vicinity. The received RF signals are converted to electrical signals by the antenna 106 and provided to the front end 108. The front end 108 filters the signals and provides conversion to baseband signals. The baseband signals are provided to the AD converter 110, which converts the baseband signals to digital signals for further processing.

In accordance with the an embodiment of the invention, the received signal (also referred to as current frame signal) is stored in Random Access Memory (RAM) 112 prior to any de-spreading of the signal. The RAM 212 comprises first and second buffers 114 and 116. In an exemplary embodiment, the first buffer 114 may be used to store a current frame signal and the second buffer 116 may be used to store a previous frame signal. The master controller 130, coupled to the RAM 114, comprises logic to toggle the use between first buffer 114 and second buffer 116. Because the signal is stored before de-spreading the signal, the memory size requirement is significantly less then if the signal was stored after de-spreading the signal. Since, the converted signal is stored in the buffer 114 or buffer 116 prior to de-spreading, advantageously system time tick 2 samples per chip may be used. Therefore, for example, the buffer size of first and second buffers, 114 and 116, may be 98304 bits or 12.3 kbytes, generally calculated using 6144 (chips)×2 samples×4 bits×2 (I and Q) equaling to approximately 98304 bits. It should be noted that size of the RAM 112, the first and second buffers, 114 and 116, might vary based on the manufacturers desired sampling rate and other factors.

The Rake receiver 118 is a conventional receiver comprising a sample selector 120, a correlator 122, a Walsh de-spreader 124 and a symbol combiner 126. The Rake receiver 118 processes the signal received on the dedicated channel to determine signaling information and sends the signaling information to a master controller 130. Using well-know techniques, the Rake receiver 118, extracts all the information necessary for master controller 130 to efficiently evaluate the supplemental channel data stored in RAM 112. The signaling information generally comprises an indication that a packet data for a particular mobile station is on the supplemental channel. The signaling information further comprises the Walsh codes, the number of supplemental channel, modulation type and coding rate used by the BS. Additionally, the signaling information may comprise a system time counter, pseudo-random noise states and Long code states.

The master controller 130 comprises logic to control the operations of all the components of the receiver. The master controller 130 includes a clock 131. The clock controls timing of the mobile station 104. The master controller 130 is coupled to the other elements of the mobile station 104 and such interconnections are not shown so as to not unduly complicate the drawing figure.

In an operation of an embodiment of the present invention, for every frame, the conventional rake receiver 118 of the receiver 104, processes the dedicated channel of the received signal. The rake receiver 118 extracts the signaling information for the current frame and sends the signaling information to the master controller 130 via the decoder 132. Simultaneously, the signal, which contains all channels, including the supplemental channels, is stored in RAM 112. The master controller 130 determines which one of the buffers, first buffer 114 or second buffer 116, to use. Generally, one buffer is used to store current frame signal and the other buffer is used to store previous frame data. Simultaneously, the master controller 130 having soft information from the previous frame, replays the previous frame data stored in RAM 112 to process the data using the soft information. The master controller 130 only replays the stored data, if the soft information indicates that a packet data for mobile station 104 is in the signal received on the supplemental channel. The master controller 130 determines which buffer to use for storing the current frame signal.

The master controller 130 comprises logic to decode the signaling information comprising the modulation type, coding rate, the Walsh codes assigned to the mobile station and the base station that transmitted the data. Using the Walsh code assignment extracted from the soft information, the master controller 130 processes the control channel and thereafter de-spreads the supplement channels to extract the data packets as defined in the 1XEV-DO and 1XEV-DV specification. The master controller 130 also comprises logic to control the operation of the interpolator 128 for generating the best sampling instant for the correlator 122. The master controller 130 uses the signaling information from Rake receiver to program the interpolator 128.

An interpolator 128 may be single hardware unit, used in a time divisional method (i.e. time shared). The interpolator 128 according to invention, controlled by a master controller 130, for generating best sampling instances.

Figure 2:
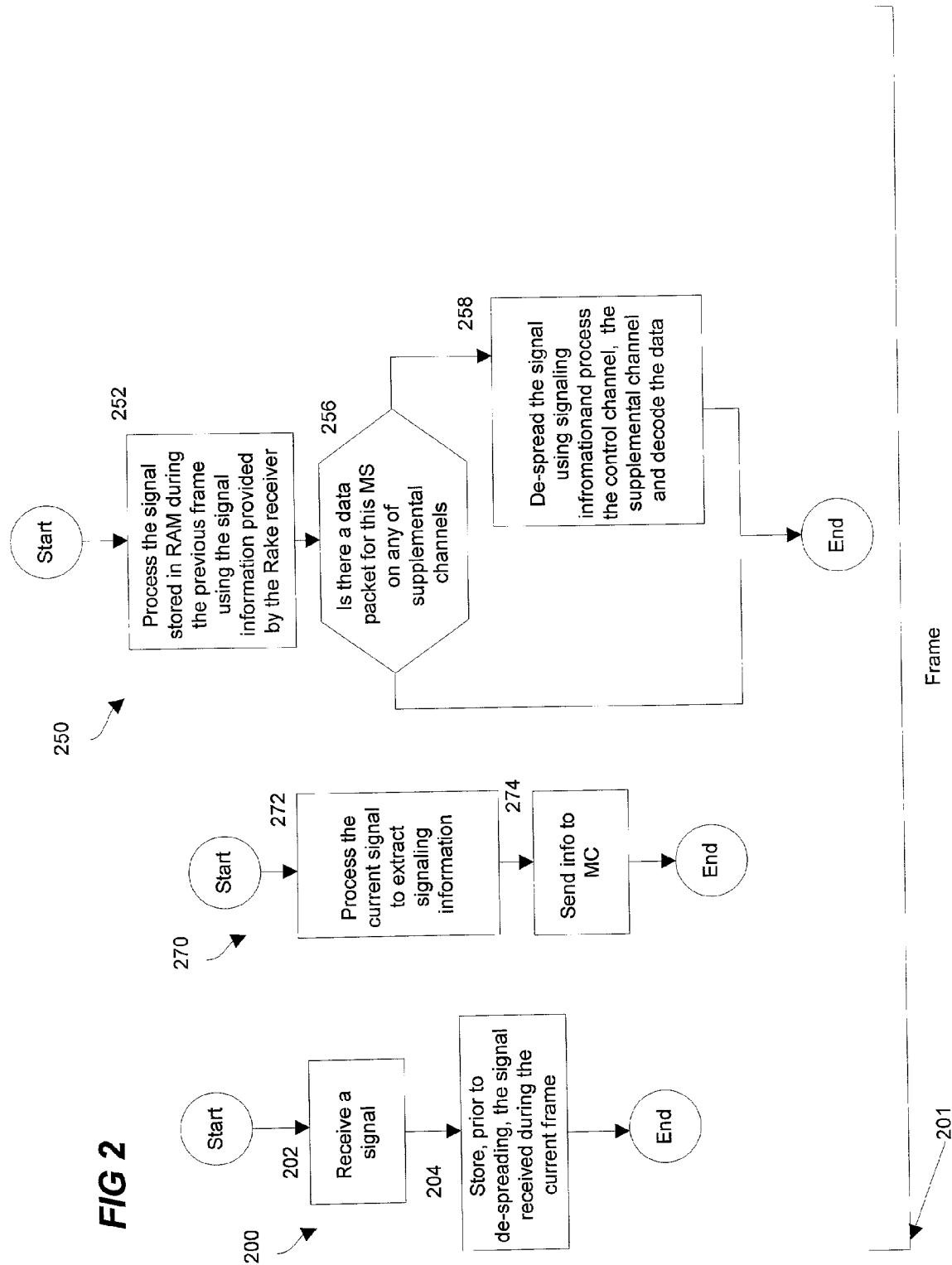
FIG. 2 illustates a flowchart for a method of operating a reciever.

FIG. 2 illustrates flowcharts of tasks, generally shown as 200, 250 and 270, which are executed simultaneously during each frame. In the preferred embodiment of the invention the master controller 130 simultaneously executes tasks, 200 and 250, and the Rake receiver 118 executes task 270. Task 200 handles the reception of the communication signal during the current frame 201 and task 250 handles the processing of the stored signal. Task 270 handles the extraction of signaling information from the signal received during the current frame.

The signal reception task 200 is initiated for every frame upon the raw signal being converted to a digital signal. At block 202, the digitally converted signal is received. At block 204, the received signal is stored in RAM 212 prior to the de-spreading of the signal. When storing the signal in RAM 212, the master controller uses the first buffer 114 and the second buffer 116. In the preferred embodiment, for every frame, master controller 130 toggles the use between the first buffer 114 and the second buffer 116 when storing the received signal. For example, in any given frame the master controller 130 may read from the first buffer 114 and write in the second buffer 116, then toggle for the next frame such that master controller 130 is now reading from the second frame 116 and writing in the first frame 114.

The signal-processing task 250 is initiated for every frame upon start of each frame. At block 252, the master controller 130 replays the signal stored in the previous frame (also referred to as, previous frame signal) and processes the stored signal using the signaling information received from the conventional rake receiver 118. At block 256, using the signaling information, the master controller 130 determines if there is a data packet for this mobile station on any of the shared supplemental channels. If yes, then at block 258, the master controller 130 de-spreads the stored signal using signaling information, such as the Walsh codes and other information. Thereafter, the master controller 130 processes the control channel, the supplemental channel and decodes the data using the signaling information.

The signaling information extraction tasks 270 is initiated for every frame upon the raw signal being converted to a digital signal. At block 272, the rake receiver 118, using well-known techniques, generally defined in the standards, extracts the signaling information from the dedicated channel of the current frame signal. At block 274, the rake receiver provides the signaling information to the master controller 130.

Figure 3:
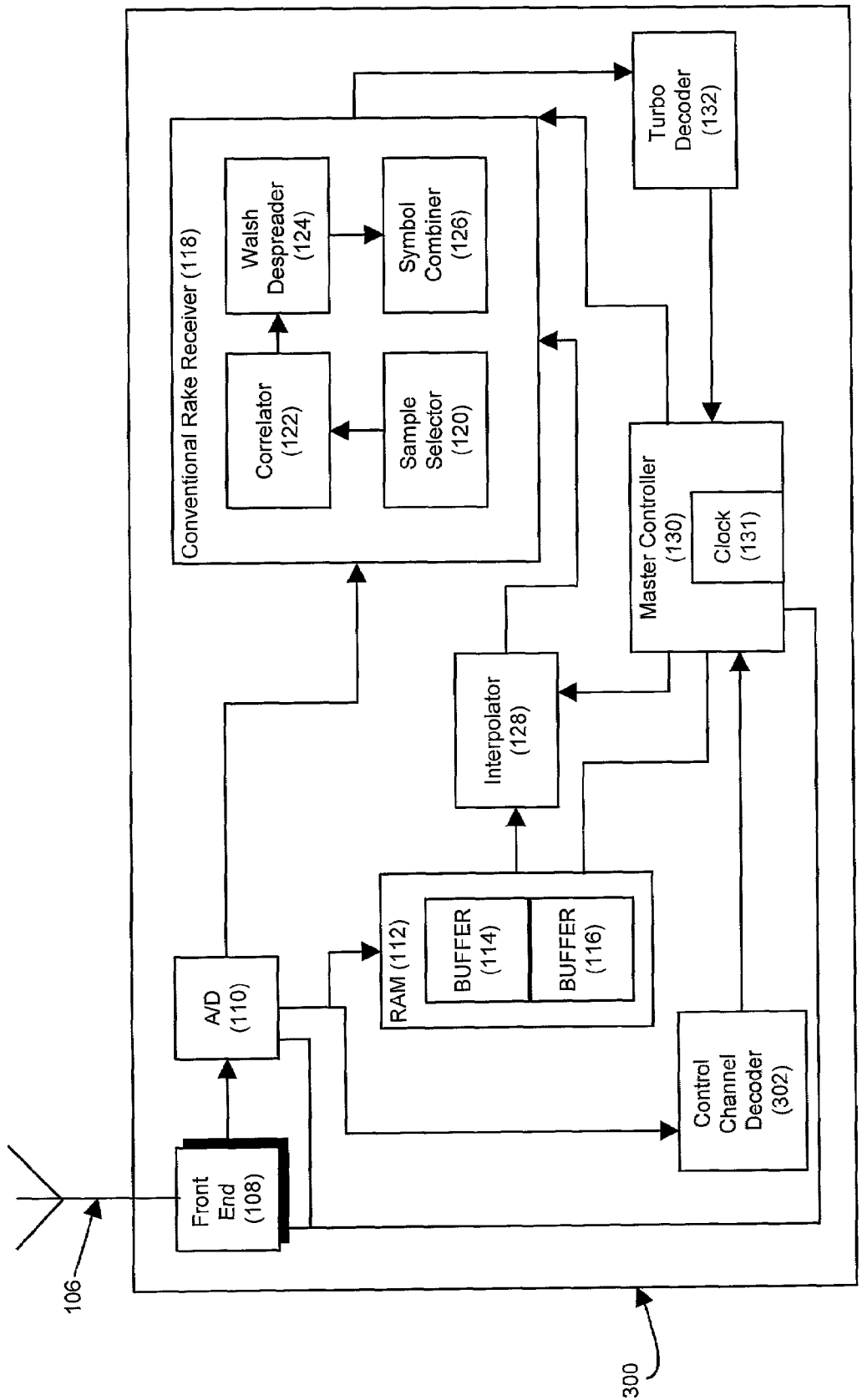
FIG. 3 illustrates a block diagram of a second embodiment of a receiver used in a wireless communication system.

FIG. 3 shows a mobile station 300 according to a second embodiment of the present invention. In this Figure, components, which are similar to those described with reference to FIG. 1, have been numbered with like reference numerals. In addition to the components described in the mobile station 104, the mobile station 300 according the second embodiment, further comprises a control channel decoder 302. The control channel decoder is coupled to the analog to digital (A2D) converter 110 and master controller 330. In an operation according to the second embodiment, the A2D converter 110 sends the converted signal to the control channel decoder 302, the Rake receiver 118 and stores the signal in RAM 112. The control channel 302 processes the control channel of the received signal and provides the information to master controller 330 to use during next frame processing. Simultaneously, the Rake receiver 118 processes the received signal to extract signaling information of the current frame. In the second embodiment, the master controller 330, uses the signaling information from Rake receiver 118 to determine is the there is any data packets for this mobile station.

The operations of the master controller 330 are similar to that described for master controller 130, except for the following. Since master controller 330 receives the control channel information from the control channel decoder 302, the master controller 330 does not process the control channel. At the start of the frame the master controller 330 replays signal and de-spreads the supplement channels to extract the data packets. The data packets are processed according to proposed standards. This embodiment offers an advantage of faster data packet processing, since the control channel decoder 302 processes the control channel information in the previous frame which is used by the master controller 330.

Figure 4:
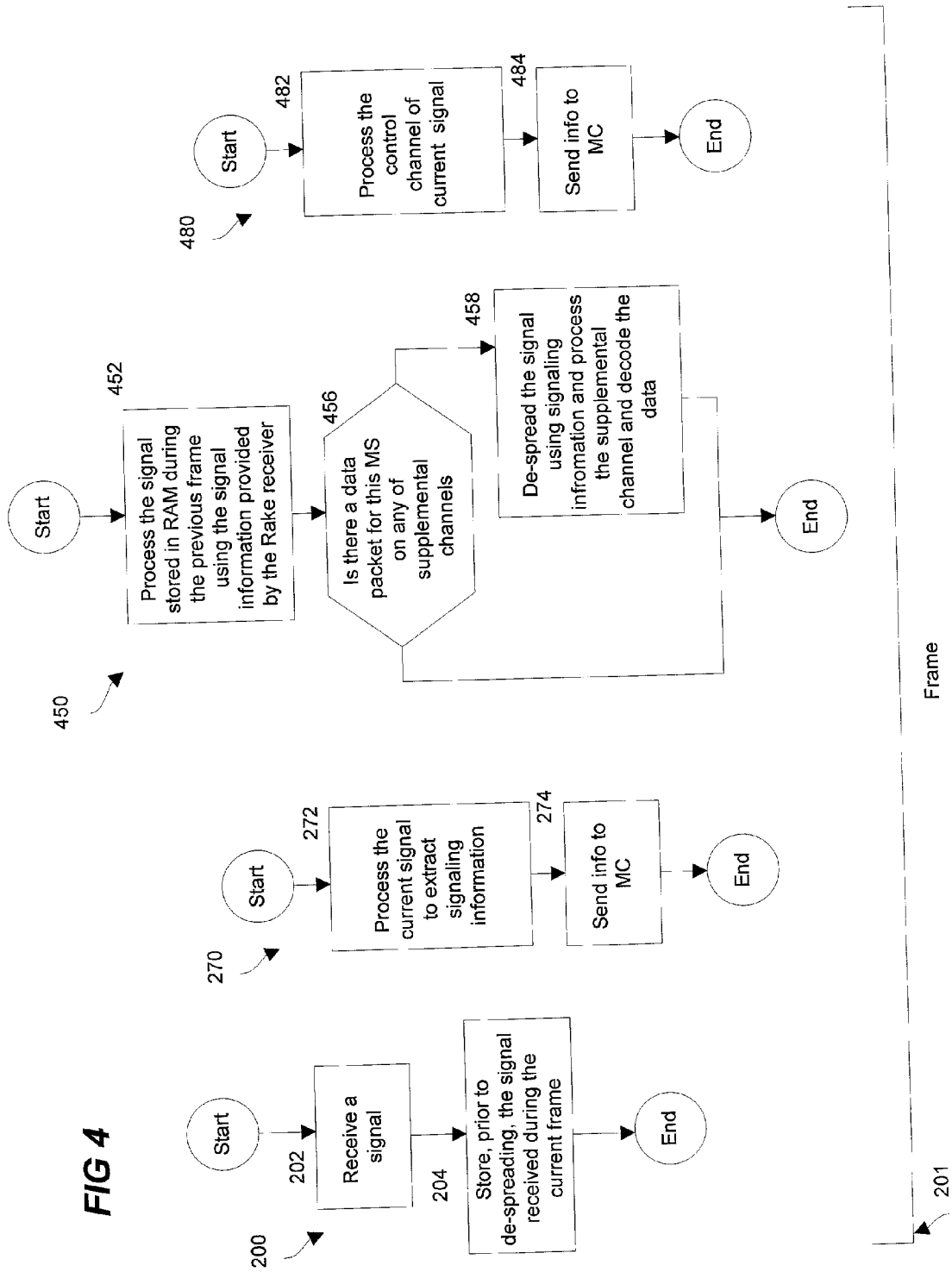
FIG. 4 illustates a flowchart for method of operating a receiver according to a second embodiment.

FIG. 4 illustrates flowcharts of tasks according to the second embodiment, generally shown as 200, 270, 450 and 480, which are executed simultaneously during each frame. In this Figure, tasks, which are similar to those described with reference to FIG. 2, have been numbered with like reference numerals (for example tasks 200 and 270).

In the second embodiment of the invention the master controller 130 simultaneously executes tasks, 200 and 450. The Rake receiver 118 executes task 270 and the control channel decoder 302 executes task 480. As described in FIG. 2, task 200 handles the reception of the communication signal during the current frame 201 and task 270 handles the extraction of signaling information from the signal received during the current frame. Task 450 handles the processing of the stored signal and task 480 handles the processing of the control channel.

The signal-processing task 450 is initiated for every frame upon start of each frame. At block 452, the master controller 130 replays the signal stored in the previous frame and processes the stored signal using the signaling information received from the conventional rake receiver 118. At block 456, using the signaling information, the master controller 330 determines if there is a data packet for this mobile station on any of the shared supplemental channels. If yes, then at block 458, the master controller 330 de-spreads the stored signal using signaling information, such as the Walsh codes and other information. Thereafter, the master controller 330 processes the supplemental channel and decodes the data using the signaling information.

The control channel-decoding task 480 is initiated for every frame upon the raw signal being converted to a digital signal. At block 482, the control channel decoder 302, decodes the received signal of the current frame to process the control channel information. At block 484, the control channel information is sent to the master controller 330.

While the invention has been particularly shown and described with reference to a preferred embodiment, it will be understood by those skilled in the art that various changes in form and details may be made therein without departing from the spirit and scope of the invention as defined by the appended claims. That is, other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. In a wireless communication system method comprising:
    receiving a current frame signal, wherein said current frame signal is received during reception of a current frame of the wireless communication system;
    storing said current frame signal in a memory to be evaluated during reception of a next frame of the wireless communication system;
    determining while storing said current frame signal, if a selected data packet is contained within a previous frame signal, using a previous frame signaling information, wherein said previous frame signal was stored in said memory and said frame signaling information was extracted during reception of a previous frame of the communication system; and
    processing while storing said current frame signal, said previous frame signal during reception of said current frame, if determined that said previous frame signal contained said data packet for the electronic device.

2. The method as claimed in claim 1, wherein the act of processing said previous frame signal comprises an act of replaying, during reception of said current frame, said previous frame signal stored in said memory.

3. The method as claimed in claim 1, wherein the act of processing said previous frame signal comprises an act of de-spreading said previous frame signal using said previous frame signaling information to retrieve said data packet.

4. The method as claimed in claim 1, wherein the act of receiving said current frame signal comprises an act of receiving said current frame signal comprises at least one control channel, at least one supplemental channel and at least one dedicated channel.

5. The method as claimed in claim 4, further comprises an act of decoding said at least one control channel by a control channel decoder during reception of said current frame.

6. The method as claimed in claim 1, wherein the act of processing said previous frame signal comprises an act of de-spreading said previous frame signal, wherein said previous frame signal comprises at least one supplemental channel.

7. The method as claimed in claim 6, wherein the act of processing said previous frame signal comprises an act of decoding said at least one supplemental channel during said current frame.

8. The method as claimed in claim 1, wherein the act of processing said previous frame signal comprises an act of de-spreading said previous frame signal, wherein said previous frame signal comprises at least one control channel and at least one supplemental channel.

9. The method as claimed in claim 8, wherein the act of processing said previous frame signal comprises an act of decoding said at least one control channel and thereafter decoding said at least one supplemental channel.

10. An electronic device comprising:
    an analog to digital (A2D) converter, said A2D converter for receiving and converting a signal to generate a current frame signal;
    a memory coupled to said A2D converter, said memory receiving said current frame signal and storing said current frame signal in said memory;
    a rake receiver coupled to said A2D converter, said receiver for receiving said current frame signal and extracting a current frame signaling information from said current frame signal; and
    a master controller coupled to said memory, said master controller for processing a previous frame signal, wherein said previous frame signal is stored in memory; said master further for using a previous frame signaling information, wherein said previous frame signaling information extracted during reception of a previous frame, to determine how to process said previous frame signal.

11. The electronic device as claimed in claim 10, wherein said current frame signal comprises at least one control channel, at least one supplemental channels and at least one dedicated channel.

12. The electronic device as claimed in claim 11, further comprises:

a control channel decoder coupled to said A2D converter, said control channel decoder for decoding said at least one control channel of said current frame signal.

13. The electronic device as claimed in claim 12, wherein said previous frame signal comprises at least one supplemental channel; and
said master controller further for decoding said at least one supplemental channel of said previous frame signal and using said previous frame signaling information.

14. The electronic device as claimed in claim 13, wherein said master controller for determining if a selected data packet was received on said at least one supplemental channel of said previous frame signal, prior to decoding said at least one supplemental channel.

15. The electronic device as claimed in claim 10, wherein said previous frame signal comprises at least one control channel, at least one supplemental channel and at least one dedicated channel.

16. The electronic device as claimed in claim 15, wherein said master controller further for decoding said at least one control channel and thereafter decoding said at least one supplemental channel of said previous frame signal.

17. The electronic device as claimed in claim 10, wherein said memory comprises a first buffer and a second buffer.

18. The electronic device as claimed in claim 17, wherein said master controller comprises logic to control the use of said first buffer and said second buffer.

19. In a wireless communication system comprising:
a front end for receiving a current frame signal, wherein said current frame signal is received during reception of a current frame of the wireless communication system;
a memory for storing said current frame signal, said memory for further storing a previous frame signal, wherein said previous frame signal stored during reception of a previous frame of the communication system; and
a controller for determining while storing said current frame signal, if a selected data packet is contained within said previous frame signal, using a previous frame signaling information, wherein said frame signaling information was extracted during reception of a previous frame of the communication system; said controller further for processing during reception of said current frame while storing said current frame signal, said previous frame signal if determined that said previous frame signal contained said data packet for the electronic device.

20. The electronic device as claimed in claim 19, said current frame signal comprises a Walsh code assignments, at least one dedicated channel, at least one control channel and at least one supplement channel.

21. The electronic device as claimed in claim 20, further comprises a control channel decoder for decoding said at least one control channel of said current frame signal.

22. The electronic device as claimed in claim 21, wherein said controller for processing said at least one supplemental channel of said previous frame signal during reception of current frame.

23. In a wireless communication system method comprising:
receiving a current frame signal, wherein said current frame signal is received during reception of a current frame of the wireless communication system;
storing said current frame signal in a memory;
retrieving while storing said current frame signal, a previous frame signaling information, said previous frame signaling information extracted during the reception of a previous frame of the wireless communication system;
determining while storing said current frame signal, using said previous frame signaling information, if a selected data packet is contained within a previous frame signal, wherein said previous frame signal was stored in said memory during reception of said previous frame of the communication system; and
processing while storing said current frame signal and during reception of said current frame, said previous frame signal using said previous frame signaling information, if determined that said previous frame signal contained said data packet.

24. An electronic device comprising:
means for receiving a current frame signal, wherein said current frame signal is received during reception of a current frame of the wireless communication system;
means for storing said current frame signal in a memory to be evaluated during reception of a next frame of the wireless communication system;
means for determining while storing said current frame signal, if a selected data packet is contained within a previous frame signal, using a previous frame signaling information, wherein said previous frame signal was stored in said memory and said frame signaling information was extracted during reception of a previous frame of the communication system; and
means for processing while storing said current frame signal, said previous frame signal during reception of said current frame, if determined that said previous frame signal contained said data packet for the electronic device.

25. The electronic device as claimed in claim 24, wherein the wireless communication system is a 1xEV-DO system.

* * * * *